United States Patent [19]
Schreckendgust

[11] 3,834,801

[45] Sept. 10, 1974

[54] REFLECTIVE ELEMENTS

[75] Inventor: Jay G. Schreckendgust, Columbus, Ohio

[73] Assignee: A. E. Staley Manufacturing Company, Decatur, Ill.

[22] Filed: Sept. 21, 1970

[21] Appl. No.: 74,120

[52] U.S. Cl. .................... 353/20, 96/38.3, 353/121
[51] Int. Cl. ........................................... G03b 21/00
[58] Field of Search .................... 353/120, 121, 122; 96/38.3

[56] References Cited
UNITED STATES PATENTS

| | | | |
|---|---|---|---|
| 2,399,799 | 5/1946 | Guellich | 96/38.3 |
| 2,969,711 | 1/1961 | Robinson | 353/116 |
| 2,999,034 | 9/1961 | Heidenhain | 96/38.3 |
| 3,441,941 | 4/1969 | Bullwinkel | 353/44 |
| 3,567,447 | 3/1971 | Chand | 96/38.3 |

FOREIGN PATENTS OR APPLICATIONS

| 1,024,168 | 0/1968 | Japan | 353/120 |
|---|---|---|---|

*Primary Examiner*—Samuel B. Rothberg
*Assistant Examiner*—A. Jason Mirabito
*Attorney, Agent, or Firm*—Charles J. Meyerson; William H. Magidson

[57] ABSTRACT

Projection of an image from a transparent photographic element onto a screen without deterioration or destruction of the transparent photographic element, by projecting a beam of light through a transparent photographic element bearing reflective image areas.

5 Claims, No Drawings

REFLECTIVE ELEMENTS

This invention relates to a process of projecting a beam of light through a transparent photographic element bearing reflective image areas and new transparent photographic elements bearing reflective image areas.

It is well known that the amount of light projected on a screen controls the eyes' ability to perceive any projected transparent photographic image on a screen. Various studies have shown that in order to provide adequate viewing contrast, the total number of lumens put out by the projection lamp and the amount of energy expressed in foot-lamberts conveyed to the screen by the projection lamp must be increased as the viewing screen size increases and/or as the amount of "surround light" (extraneous light falling on the viewing area) increases. Unfortunately, it is also well known that transparent photographic elements (roll films, film strips, slides, microfilm, etc.) are subject to distortion and/or complete destruction during optical projection due to the absorption of heat generated by the projection lamp. In order to overcome this problem, various compromises have been made in the design of projectors, their components, viewing conditions, screen size, etc.

Although it would be desirable to view projected transparent photographic images under daylight or room light viewing conditions, these images are normally projected on a screen in a darkened area to provide viewing contrast. Darkened viewing conditions are necessary in order to permit the projection of an image on a screen with light sources generating a relatively low amount of heat. However, even under darkened viewing conditions, viewing contrast may be unacceptable. For example, in classrooms, where it is difficult to prevent extraneous light, and it is necessary to project a reasonably large size image in order to accommodate the size of the class, viewing contrast is often of extremely poor quality. Much the same situation arises in outdoor movie theatres, especially during summer months, where, generally speaking, projection starts at twilight when it is extremely difficult to perceive the projected image, but becomes clearer as it becomes darker outside.

Various projector modifications have been made in order to reduce the amount of heat falling on the transparent photographic element. For example, dichroic light sources have been used at great expense to reduce by about 50% the amount of infrared heat projected on transparent photographic elements by the light source. Likewise, projectors are commonly equipped with cooling means to dissipate the heat generated by the projection lamps and minimize the distortion and/or destruction of the transparent photographic element. However, these techniques are a relatively poor answer to the overall problem. According to Ross in the May, 1951 Journal of the SMPTE, Vol. 56 at page 550, the maximum focused light intensity attainable without deterioration of slides is about 9,000 lumens per square inch at the gate.

Since the distortion and/or destruction of transparent photographic elements is dependent upon the length of time that the transparent photographic element is subjected to heat, it is normally necessary to employ much smaller projection light sources in slide projectors and microfilm readers than in movie film projectors. In the case of home movie projectors containing stop-action viewers, the projectors are often equipped with protective heat filters that can be interposed between the viewing light and transparent film. This protects the film from the light's heat during stop-action viewing. This, of course, results in decreased contrast during stop-action viewing and possible deterioration of the film frame.

Virtually all archival film is of the so-called silver halide class due to the relatively good storage stability of such film. However, these films must be duplicated periodically in order to preserve the record. Deterioration of such films is often due to bacterial decomposition of the gelatin matrix caused by protease enzymes. Further, unless adequate care is taken during processing to remove all developing chemicals, trace amounts of residual developer tend to lead to deterioration of the image. Silver halide film also has the disadvantage that it is relatively expensive due to the high costs of silver and photographic grade gelatin.

The principal object of this invention is to provide a method of projecting a beam of high intensity light through transparent photographic elements without destruction and/or deterioration of the transparent photographic elements. A second object of this invention is to provide a new class of slides capable of withstanding over 10,000 lumens per square inch. A further object of this invention is to provide a low cost, new class of archival film. Other objects will appear hereinafter.

For the purposes of this invention, "reflective image areas" refer to reflective powder and/or opaque reflective metallic areas on the transparent photographic element. Correspondingly, "non-image areas" refer to the areas wherein light is projected onto the screen when the transparent photographic elements are viewed in a projector or viewer. The term "lumens" when used to describe the light source, refers to the amount of energy given off by the light source. Lumens per square inch refers to the amount of energy applied to transparent elements at the film gate.

The principal object of this invention can be attained by projecting a beam of light through a transparent photographic element comprising a transparent base bearing reflective image areas. While conventional silver halide slides scorch in about 2 seconds when subjected to about 24,000 lumens per square inch, the transparent photographic elements of this invention do not decompose when subjected to about 90,000 lumens per square inch. The enhanced heat stability of the reflective transparent photographic elements of this invention makes it possible to project a 3 inch × 4 inch slide on a 400 square foot outdoor screen under average or typical sun light during the summer solstice at high noon or approximately a 6,000 square foot screen outdoors in late afternoon. This means that the reflective photographic elements of this invention can be viewed in the classroom or home without dimming lights, and/or in outdoor movie theatres or advertising displays during daylight viewing hours, whereas the present transparent photographic elements of commerce must be viewed under subdued light to obtain the same contrast obtainable with the reflective film of the present invention.

The radical difference in the heat stability of the reflective transparent elements of this invention is due to the fact that conventional silver halide slides, film, etc. developed to a 1.5 neutral density, absorb 97 percent of the infrared heat in the incident light of the lamp. The image areas of the conventional transparent element act as black bodies and substantially all of the heat or infrared energy passing through the film is absorbed with the destruction and/or deterioration of the film. On the other hand, the reflective elements of this invention absorb only minor amounts of infrared. Typically, a discontinuous aluminum image of the type discussed below will absorb approximately 10 percent of the infrared heat falling on its surface. An aluminum powder image will absorb about 15 percent of the infrared energy falling on it. A discontinuous rhodium image will absorb about 20 percent of the infrared energy falling on it. Accordingly, it can be readily seen that the amount of infrared heat actually absorbed by the reflective elements utilized in this invention is of a low order compared to the absorption of infrared heat by conventional transparent photographic elements of commerce.

In general, the reflective transparent photographic elements suitable for use in this invention comprise a series of frames or slides, wherein substantially all of said frames or slides comprise a transparent base bearing reflective image areas. The reflective image areas may be composed of either an array of reflective powder particles in image-wise configuration, or a substantially discontinuous metallic film in image-wise configuration. While these reflective elements may be produced by various techniques, the preferred methods of producing these elements entail the use of deformation imaging of the type described and claimed in copending, commonly assigned application Ser. No. 796,847, filed Feb. 5, 1969, now U.S. Pat. No. 3,637,385 issued Jan. 25, 1972 which is incorporated by reference. For example, a transparent base, bearing a substantially transparent light-sensitive layer capable of developing a $R_d$ of 0.2 to 2.2 (preferably a positive-acting, light-sensitive layer capable of developing a $R_d$ of 0.4 to 2.0) is exposed to actinic radiation to develop a potential $R_d$ of 0.2 to 2.2, said light-sensitive layer is developed with reflective powder particles to embed said reflective powders as a monolayer in the surface of said light-sensitive layer in image-wise configuration, non-embedded solid particles are removed from said light-sensitive layer giving rise to an array of reflective powder particles in an image-wise configuration on the transparent base. By suitable choice of base, light-sensitive layer, developing powder and processing techniques, it is possible to produce substantially discontinuous reflective metallic films in image-wise configuration on a transparent base utilizing deformation imaging.

Broadly speaking, the preferred method of depositing superficially dry powders in image-wise configuration to produce transparent photographic elements differs from other methods of forming powder images in various subtle and unobvious ways. For example, the powder particles are not merely dusted on, but instead are applied against the surface of the light-sensitive organic layer under moderate physical force after exposing the light-sensitive layer to actinic radiation. The relatively soft or particle-receptive nature of the light-sensitive layer is such that substantially a monolayer of powder particles, or isolated small agglomerates of a predetermined size, are at least partially embedded at the surface of the light-sensitive layer by moderate physical force. The surface condition in the particle receptive area is at most only slightly soft but not fluid as in prior processes. The relatively hard or particle non-receptive condition of the light-sensitive surface in the non-image areas is such that when powder particles of a predetermined size are applied under the same moderate physical force few, if any, are embedded sufficiently to resist removal by moderate dislodging action such as blowing air against the surface. Any particles remaining in the non-image areas are removed readily by rubbing a soft pad over the surface.

The solid, light-sensitive organic layer, which can be an organic material in its naturally occurring or manufactured form or a mixture of said organic material with plasticizers and/or photoactivators for adjusting the powder receptivity and sensitivity to actinic radiation, are capable of developing a predetermined contrast or $R_d$ using a suitable black developing powder under the conditions of development. The powder-receptive areas of the layer (unexposed areas of a positive-acting, light-sensitive material or the exposed areas of a negative-acting, light-sensitive material) have a softness such that suitable particles can be embedded into a stratum at the surface of the light-sensitive layer by mild physical forces. However, the layer should be sufficiently hard that film transparencies can be pressed against the surface without the surfaces sticking together or being damaged even when heated slightly under high intensity light irradiation. The film should also have a degree of toughness so that it maintains its integrity during development. If the $R_d$ of the light-sensitive layer is below about 02, the light-sensitive layer is too hard to accept a suitable concentration of powder particles. On the other hand, if the $R_d$ is above about 2.2, the light-sensitive layer is so soft that it is difficult to maintain film integrity during physical development and the layer tends to adhere to transparencies precluding the use of vacuum frame or contact exposure equipment. Further, if the $R_d$ is above 2.2, the light-sensitive layer is so soft that more than one layer of powder particles may be deposited with attendant loss of image fidelity and the layer may be displaced by mechanical forces resulting in distortion or destruction of the image. Accordingly, for use in this invention, the light-sensitive layers are capable of developing a $R_d$ within the range of 0.2 to 2.2 or preferably 0.4 to 2.0, using a suitable black developing powder under the conditions of development.

The $R_d$ of a positive-acting, light-sensitive layer, which is called $R_{dp}$, is a photometric measurement of the reflection density of a black power-developed light-sensitive layer after a positive-acting, light-sensitive layer has been exposed to sufficient actinic radiation to convert the exposed areas into a substantially powder-non-receptive state (clear the background). The $R_d$ of a negative-acting, light-sensitive layer, which is called $R_{dn}$, is a photometric measurement of the reflection density of a black power-developed area, after a negative-acting, light-sensitive layer has been exposed to sufficient actinic radiation to convert the exposed area into a powder-receptive state.

In somewhat greater detail, the reflection density of a solid, positive-acting, light-sensitive layer ($R_{dp}$) is determined by coating the light-sensitive layer on a white substrate, exposing the light-sensitive layer to sufficient actinic radiation image-wise to clear the background of the solid, positive-acting, light-sensitive layer, applying a black powder (prepared from 77 percent Pliolite VTL and 23 percent Neo Spectra carbon black in the manner described below) to the exposed layer, physically embedding said black powder under the conditions of development as a monolayer in a stratum at the surface of said light-sensitive layer and removing the non-embedded particles from said light-sensitive layer. The developed organic layer containing black powder-embedded image areas and substantially powder-free non-image areas is placed in a standard photometer having a scale reading from 0 to 100 percent reflection of incident light or an equivalent density scale, such as on Model 500 A photometer of the Photovolt Corporation. The instrument is zeroed (0 density; 100 percent reflectance) on a powder-free free non-image area of the light-sensitive organic layer and an average $R_d$ reading is determined from the powder developed area. The reflection density is a measure of the degree of blackness of the developed surface which is relatable to the concentration of particles per unit area. The reflection density of a solid, negative-acting, light-sensitive layer ($R_{dn}$) is determined in the same manner except that the negative-acting, light-sensitive layer is exposed to sufficient actinic radiation to convert the exposed area into a powder-receptive area. If the $R_d$ under the conditions of development is between 0.2 (63.1 percent reflectance) and 2.2 (0.63 percent reflectance), or preferably between 0.4 (39.8 percent reflectance) and 2.0 (1.0 percent reflectance), the solid, light-sensitive organic material deposited in a layer is suitable for use in this sensitive organic material deposited in a layer is suitable for use in this invention.

Although the $R_d$ of light-sensitive layers is determined by using the aforesaid back developing powder and a white substrate, the $R_d$ is only a measure of the suitability of a light-sensitive layer for use in the preferred method of producing reflective transparent photographic elements.

Since the $R_d$ of any light-sensitive layer is dependent on numerous factors other than the chemical constitution of the light-sensitive layer, the light-sensitive layer is best defined in terms of its $R_d$ under the development conditions of intended use. The positive-acting, solid, light-sensitive organic layers useful in this invention must be powder-receptive in the sense that the aforesaid black developing powder can be embedded as a monoparticle layer into a stratum at the surface of the unexposed layer to yield a $R_{dp}$ of 0.2 to 2.2 (0.4 to 2.0 preferably) under the predetermined conditions of development and light-sensitive in the sense that upon exposure to actinic radiation the most exposed areas can be converted into the non-particle-receptive state (background cleared) under the predetermined conditions of development. In other words, the positive-acting, light-sensitive layer must contain a certain inherent powder receptivity and light-sensitivity. The positive-acting, light-sensitive layers are apparently converted into the powder-non-receptive state by a light-catalyzed hardening action, such as photopolymerization, photocrosslinking, photooxidation, etc. Some of these photo-hardening reactions are dependent on the presence of oxygen, such as the photooxidation of internally ethylenically unsaturated acids and esters while others are inhibited by the presence of oxygen, such as those based on the photopolymerization of vinylidene or polyvinylidene monomers alone or together with polymeric materials. The latter requires special precautions, such as storage in oxygen-free atmosphere or oxygen-impermeable cover sheets. For this reason, it is preferable to use solid, positive-acting, film-forming, organic materials containing no terminal ethylenic unsaturation.

The negative-acting, solid, light-sensitive organic layers useful in this invention must be light-sensitive in the sense that, upon exposure to actinic radiation, the most exposed areas of the light-sensitive layer are converted from a non-powder-receptive state under the predetermined conditions of development to a powder-receptive state under the predetermined conditions of development. In other words, the negative-acting, light-sensitive layer must have a certain minimum light-sensitivity and potential powder receptivity. The negative-acting, light-sensitive layers are apparently converted into the powder-receptive state by a light-catalyzed softening action, such as photodepolymerization, photoisomerization, etc.

In general, the positive-acting, solid, light-sensitive layers useful in this invention comprise a film-forming organic material in its naturally occurring or manufactured form or a mixture of said organic material with plasticizers and/or photoactivators for adjusting powder receptivity and sensitivity to actinic radiation. Suitable positive-acting, film-forming organic materials, which are not inhibited by oxygen, include internally ethylenically unsaturated acids, such as abietic acid, rosin acids, partially hydrogenated rosin acids, such as those sold under the name Staybelite resin, wood rosin, etc., esters of internally ethylenically unsaturated acids, methylol amides of maleated oils such as described in U.S. Pat. No. 3,471,466, phosphatides of the class described in application Ser. No. 796,841 filed on Feb. 5, 1969 now U.S. Pat. No. 3,585,031 issued June 15, 1971 in the name of Hayes, such as soybean lecithin, partially hydrogenated lecithin, dilinolenyl-alpha-lecithin, etc., partially hydrogenated rosin acid esters, such as those sold under the name Staybelite esters, rosin modified alkyds, etc.; polymers of ethylenically unsaturated monomers, such as vinyltoluene-alpha methyl styrene copolymers, polyvinyl cinnamate, polyethyl methacrylate, vinyl acetate-vinyl stearate copolymers, polyvinyl pyrrolidone, etc.; coal tar resins such as coumarone-indene resins, etc.; halogenated hydrocarbons, such as chlorinated waxes, chlorinated polyethylene, etc. Positive-acting, light-sensitive materials, which are inhibited by oxygen include mixtures of polymers, such as polyethylene terephthalate/sebacate, or cellulose acetate or acetate/butyrate, with polyunsaturated vinylidene monomers, such as ethylene glycol diacrylate or dimethacrylate, tetraethylene glycol diacrylate or dimethacrylate, etc.

Although numerous positive-acting, film-forming organic materials have the requisite light-sensitivity and powder-receptivity at predetermined development temperatures, it is generally preferable to compound the film-forming organic material with photoactivator(s) and/or plasticizer(s) to impart optimum powder receptivity and light-sensitivity to the light-sensitive layer. In most cases, the light-sensitivity of an element can be increased many fold by incorporation of a suitable photoactivator capable of producing free-radicals, which catalyze the light-sensitive reaction and reduce the amount of photons necessary to yield the desired physical change.

Suitable photoactivators capable of producing free-radicals include benzil, benzoin, Michlers ketone, diacetyl, phenanthraquinone, p-dimethyl-aminobenzoin, 7,8-benzoflavone, trinitrofluorenone, desoxybenzoin, 2,3-pentane-dione, dibenzylketone, nitroisatin, di(6-dimethylamino-3-pyridyl)methane, metal napthenates, N-methyl-N-phenylbenzylamine, pyradil, 5,7-dichloroisatin, azodiisobutyronitrile, trinitroanisole, chlorophyll, isatin, bromoisatin, etc. These compounds can be used in a concentration of 0.001 to 2 times the weight of the film-forming organic material (01–200 percent the weight of film former). As in most catalytic systems, the best photoactivator and optimum concentration thereof are dependent upon the film-forming organic material. Some photoactivators respond better with one type of film former and may be useful with substantially all film-formers in wide concentration ranges.

The acyloin and vicinal diketone photoactivators, particularly benzil and benzoin are preferred. Benzoin and benzil are effective over wide concentration ranges with substantially all film-forming, light-sensitive organic materials. Benzoin and benzil have the additional advantage that they have a plasticizing or softening effect on film-forming, light-sensitive layers, thereby increasing the powder receptivity of the light-sensitive layers. When employed as a photoactivator, benzil should preferably comprise at least 1 percent by weight of the film-forming organic material (0.01 times the film former weight).

Dyes, optical brighteners and light absorbers can be used alone or preferably in conjunction with the aforesaid free-radical producing photo-activators (primary photoactivators) to increase the light-sensitivity of the light-sensitive layers of this invention by converting light rays into light rays of longer lengths. For convenience, these secondary photoactivators (dyes, optical brighteners and light absorbers) are called "superphotoactivators." Suitable dyes, optical brighteners and light absorbers include 4-methyl-7-dimethylaminocoumarin, Calcofluor yellow HEB (preparation described in U.S. Pat. No. 2,415,373), Calcofluor white SB super 30080, Calcofluor, Uvitex W conc., Uvitex TXS conc., Uvitex RS (described in Textil-Rundschau 8 [1953], 339), Uvitex WGS conc., Uvitex K, Uvitex CF conc., Uvitex W (described in Textil-Rundschau 8, [1953], 340), Aclarat 8678, Blancophor OS, Tenopol UNPL, MDAC S-8844, Uvinul 400, thioflavin TGN conc., aniline yellow — S (low conc.), Setoflavine T 5506-140, Auramine 0, Calcozine yellow OX, Calcofluor RW, Calcofluor GAC, Acetosol yellow 2 RLS-PHF, eosine bluish, Chinoline yellow-P conc., Ceniline yellow S (high conc.), anthracene blue violet fluorescence, Calcofluor white MR, Tenopol RCR, Uvitex GS, acid-yellow-T-supra, Acetosol yelloe 5 GLS, Calcocid OR. Y. Ex. Conc., diphenyl brilliant flavine 7 GFF, Resoform fluorescent yellow 3 GPI, eosine yellowish, Thiazole Fluorescor G, pyrazolone organe YB-3, and National FD&C yellow. Individual superphotoactivators may respond better with one type of light-sensitive organic film-former and photoactivator than with others. Further, some photoactivators function better with certain classes of brighteners, dyes and light absorbers. For the most part, the most advantageous combinations of these materials and proportions can be determined by simple experimentation.

As indicated above, plasticizers can be used to impart optimum powder receptivity to the light-sensitive layer. With the exception of lecithin, most of the film-forming, light-sensitive organic materials useful in this invention are not powder-receptive at room temperature but are powder-receptive above room temperature. Accordingly, it is desirable to add sufficient plasticizer to impart room temperature (15°to 30°C.) or ambient temperature power-receptivity to the light-sensitive layers and/or broaden the $R_{dp}$ range of the light-sensitive layers.

While various softening agents, such as dimethyl siloxanes, dimethyl phthalate, glycerol, vegetable oils, etc. can be used as plasticizers, benzil and benzoin are preferred since, as pointed out above, these materials have the additional advantage that they increase the light-sensitivity of the film-forming organic material. As plasticzer-photoactivators, benzoin and benzil are preferably used in a concentration of 1 percent to 80 percent by weight of the film-forming solid organic material.

The preferred positive-acting, light-sensitive film formers containing no conjugated terminal ethylenic unsaturation include the esters and acids of internally ethylenically unsaturated acids, particularly the phosphatides, rosin acids, partially hydrogenated rosin acids and the partially hydrogenated rosin esters. These materials, when compounded with suitable photoactivators, preferably acyloins or vicinal diketones together with superphotoactivators, require less than 2 minutes exposure to clear the background of light-sensitive layers.

In general, the negative-acting, light-sensitive layers useful in this invention comprise a film-forming organic material in its naturally occurring or manufactured form, or a mixture of said organic material with plasticizers and/or photoactivators for adjusting powder receptivity and sensitivity to actinic radiation. Suitable negative-acting, film-forming organic materials include n-benzyl linoleamide, dilinoleyl-alpha-lecithin, castor wax (glycerol 12-hydroxy-stearate), ethylene glycol monohydroxy stearate, polyisobutylene, polyvinyl stearate, etc. Of these, castor wax and other hydrogenated ricinoeic acid esters (hydroxystearate) are preferred. These materials can be compounded with plasticizers and/or photoactivators in the same manner as the positive-acting, light-sensitive, film-forming organic materials.

Some solid, light-sensitive organic film formers can be used to prepare either positive- or negative-acting, light-sensitive layers. For example, a poly(n-butyl methacrylate) layer containing 20 percent benzoin (20 parts by weight benzoin per 100 parts by weight polymer) yields good positive-acting images. Increasing the benzoin level to 100 percent converts the poly(n-butyl methacrylate) layer into a good negative-acting system.

The light-sensitive layers are formed by applying a thin layer of solid, light-sensitive, film-forming organic material having a potential $R_d$ of 0.2 to 2.2 (i.e., capable of developing a $R_{dp}$ or $R_{dn}$ of 0.2 to 2.2) to the base by any suitable means dictated by the nature of the film-forming organic material and/or the base (hot-melt, draw down, spray, roller coating or air knife, flow, dip or whirler coating, curtain coating, etc.) so as to produce a reasonably smooth, homogeneous layer of from 0.1 to 40 microns thick employing suitable solvents, as necessary.

The bases suitable for use in producing reflective transparent photographic elements are of two distinct types. The first type, which is primarily suitable for producing transparent photographic elements having an array of reflective powders in image-wise configuration, is substantially transparent and can be composed of one or more transparent layers. The second type, which is primarily suitable for producing transparent photographic elements having a substantially discontinuous metallic film in image-wise configuration, comprises a substantially transparent base composed of one or more transparent layers bearing a reflective opaque metallized subbing layer. Suitable transparent layers include glass, cellulose esters (cellulose acetate, cellulose propionate, cellulose butyrate, etc.), surface hydrolyzed cellulose acetate, regenerated cellulose, polyesters (polyethylene terephthalate), nylon polystyrene, polyethylene, polypropylene, corona discharge treated polyethylene and polypropylene, polyvinyl alcohol, amylose, etc. Any one or more of these transparent layers can be employed bearing a suitable reflective opaque metallic subbing layer, such as aluminum, rhodium, nickel, etc. If desired, the transparent base may contain a suitable dye to obtain various colored effects.

The light-sensitive layer must be at least 0.1 micron thick and preferably at least 0.4 microns in order to hold suitable powders during development. If the light-sensitive layer is less than 0.1 microns, or the developing powder diameter is more than 25 times layer thickness, the light-sensitive layer does not hold the developing powder with the necessary tenacity. In general, as layer thickness increases, the light-sensitive layer is capable of holding larger particles. However, as the light-sensitive layer thickness increases, it becomes increasingly difficult to maintain film integrity during film development. Accordingly, the light-sensitive layer must be from 0.1 to 40 microns, preferably from 0.4 to 10 microns, with 0.5 to 2.5 microns being best.

The preferred method of applying light-sensitive layers of predetermined thicknesses to the base (to the transparent base in the case of the first type of reflective element or to the metallic subbing layer in the case of the second type of reflective elements) comprises flow coating a solution in an organic solvent vehicle (hydrocarbons, such as hexane, heptane, benzene, etc.; halogenated hydrocarbons, such as chloroform, carbon tetrachloride, 1, 1, 1,-trichloroethane, trichloroethylene, etc.; alcohols, such as ethanol, methanol, isopropanol, etc.; ketones, such as acetone, methyl ethyl ketone, etc.) of the light-sensitive organic film-former alone or together with dissolved or suspended photoactivators or plasticizers onto the base. The hydrocarbons and halohydrocarbons, which are excellent solvents for the preferred positive-acting, light-sensitive film formers, containing no terminal conjugated ethylenic unsaturation, are the preferred vehicles because of their high volatility and low cost. Typically, solutions prepared with these vehicles can be applied to the base and air-dried to a continuous clear film in less than one minute. In general, the halohydrocarbons have the advantage that they are non-flammable and can be used without danger of flash fires. However, many of these, such as chloroform and carbon tetrachloride must be handled with care due to the toxicity of their vapors. Of all these solvents, 1,1,1-trichloroethane is preferred since it has low toxicity, is non-flammable and low cost and has high volatility. In general, the thickness of the light-sensitive layer can be varied as a function of the concentration of the solids dissolved in the solvent vehicle.

After the base is coated with a suitable solid, light-sensitive organic layer, a latent image is formed by exposing the element to actinic radiation in image-receiving manner for a time sufficient to provide a potential $R_d$ of 0.2 to 2.2. (clear the background of the positive-acting, light-sensitive layers or establish a potential $R_{dn}$ of 0.2 to 2.2 with negative-acting, light-sensitive layers). The light-sensitive elements can be exposed to actinic radiation to a photographic positive or negative, which may be line, half-tone or continuous tone.

As indicated above, the latent images are preferably produced from positive-acting, light-sensitive layers by exposing the element in image-receiving manner for a time sufficient to clear the background, i.e., render the exposed areas non-powder-receptive. As explained in commonly assigned application Ser. No. 796,847, now U.S. Pat. No. 3,637,385 issued Jan. 25, 1972 the amount of actinic radiation necessary to clear the background varies to some extent with developer powder size and development conditions. Due to these variations, it is often desirable to slightly overexpose line and half-tone images in order to assure complete clearing of the background. Slightly more care is necessary in producing continuous-tone powder images since overexposure tends to decrease the tonal range of the developed image. In general, overexposure is preferred with negative-acting, light-sensitive elements in provide to provde maximum contrast.

After the light-sensitive element is exposed to actinic radiation for a time sufficient to clear the background of a positive-acting, light-sensitive layer or establish a potential $R_{dn}$ of 0.2 to 2.2, a suitable developing powder having a diameter or dimension along one axis of at least 0.3 microns is applied physically with a suitable force, preferably mechanically, to embed the powder in the light-sensitive layer. The developing powder can be virtually any shape, such as spherical, acicular, platelets, etc.

Developing powders suitable for use in producing reflective deformation transparent photographic elements having an array of reflective particles in image-wise configuration can be either substantially white powders or reflective metallic powders. Suitable white developing powders include polymeric or resinous materials, such as Pliolite VTL (vinyltoluene-butadiene copolymer), polymethyl methacrylate, polystyrene, rice starch, corn starch, slightly yellowish phenol-formaldehyde resins, etc.; organic monomeric compunds, such as hydroquinone, etc.; metal oxides and salts, such as titanium dioxide, magnesium oxide, zinc oxide, lead carbonate, calcium carbonate, barium sulfate, etc. Suitable metal powders include aluminum flakes, nickel flakes, rhodium powders, etc. For the most part, reflective images capable of resolving 20 to 60 line pairs per mm. can be produced with these powders.

Developing powders suitable for use in producing reflective deformation transparent photographic elements having a substantially discontinuous metallic film in image-wise configuration can comprise a material capable of forming a protective resist or a superficially dry etchant capable of removing the opaque metallic subbing layer in image-wise configuration. Suitable polymeric or resinous materials capable of forming a resist include Pliolite VTL, polymethyl methacrylate, polystyrene, phenol-formaldehyde resins, etc.

Superficially dry etchants can be employed in the manner described and claimed in commonly assigned application Ser. No. 74,122 filed Sept. 21, 1970, now U.S. Pat. No. 3,677,756, issued July 18, 1972 which is incorporated by reference. As explained therein, the superficially dry etchant can be applied in a substantially pure form if it is a solid at room temperature or on a suitable carrier. However, the carriers must be substantially inert with respect to the etchant employed. Carriers, such as resinous or polymeric materials, clays (Bentonite), inert oxides silica, titanium dioxide), etc., can be employed to regulate the concentration of the etchant to be applied, or in the case of a liquid etchant, permit the application of the liquid etchant to the light-sensitive layer in superficially dry powder form. The etchant, if solid, can be ballmilled with carrier in order to coat the carrier with etchant or, if desired, blended above the melting point of fusible or resinous carriers, ground to a suitable size and classified. In general, liquid etchants can be adsorbed on the surface of a suitable solid carrier or encapsulated in a suitable carrier. In some cases, it is advantageous to dissolve carrier and etchant (solid or liquid) in a mutual solvent, dry and grind to suitable size. The superficially dry etchant powder can contain from about 0.1 to 100 percent by weight etchant and correspondingly 99.9 to 0 percent by weight carrier.

Suitable active etchants include acids, such as hydrochloric acid, etc.; acidic metal salts such as ferric chloride, cupric chloride, cadmium chloride, magnesium chloride, zinc chloride, ferric nitrate, etc.; strong bases, such as sodium hydroxide, potassium hydroxide, etc. To a large extent the particular etchant or etchants employed are dependent upon the layer to be etched and the carrier or means employed to dispense the etchant. For example, the liquid etchants of the type described above must be applied in either encapsulated form or on a suitable carrier. On the other hand, solid etchants, such as acidic metal salts or superficially dry bases, can be deposited in powder form or dissolved in a suitable solvent and either applied on a carrier or encapsulated for subsequent activation.

The black developing powder for determing the $R_d$ of a light-sensitive layer is formed by heating about 77 percent Pliolite VTL (vinyltoluene-butadiene copolymer) and 23 percent Neo Spectra carbon black at a temperature above the melting point of the resinous carrier, blending on a rubber mill and then grinding in a Mikro-atomizer. Commercially available powders, such as Xerox 914 Toner, give substantially similar results although tending toward slightly lower $R_d$ values.

The developing powders useful in this invention contain particles having a diameter or dimension along at least one axis of from about 0.3 to 40 microns, preferably from 0.5 to 15 microns with powders of the order of 1 to 7 microns being best for light-sensitive layers of 0.4 to 10 microns. Maximum particle size is dependent on the thickness of the light-sensitive layer while minimum particle size is independent of layer thickness. Electron microscope studies have shown that developing powders having a diameter 25 times the thickness of the light-sensitive layer cannot be permanently embedded in light-sensitive layers, and generally speaking, best results are obtained when the diameter of the powder particle is less than about 10 times the thickness of the light-sensitive layer. For the most part, particles over 40 microns are not detrimental to image development provided the developing powder contains a reasonable concentration of powder particles over 40 microns but, which are less than 25 times, and preferably less than 10 times, the light-sensitive layer thickness. However, other things being equal, the larger the developer powder particles (above 10 microns), the lower the $R_d$ of the developed image. For example, when Xerox 914 Toner, classified to contain (a) all particles under 1 micron, (b) 1 to 3 micron particles, (c) 3 to 10 micron particles (d) 10 to 18 microns and (e) all particles over 18 microns, was used to develop positive-acting 1-micron-thick lecithin light-sensitive elements, after the same exposure the images had a $R_{dp}$ of (a) 0.83, (b) 0.95, (c) 0.97, (d) 0.32 and (e) 0.24, respectively.

Although particles over 40 microns are not detrimental to image development, the presence of particles under 0.3 micron diameter along all axes can be detrimental to proper image formation. In general, it is preferable to employ developing powders having substantially all powders having a diameter along at least one axis not less than 0.3 micron, preferably more than 0.5 micron, since particles less than 0.3 micron tend to embed in non-image areas.

As the particles size of the small particles increases, less exposure to actinic radiation is required to clear the background. For example, when Xerox 914 Toner, classified to contain (a) all particles under 1 micron, (b) 1 to 3 micron particles (c) 3 to 10 micron particles, (d) 10 to 18 micron particles and (e) over 18 micron particles, was used to develop the light-exposed portions of positive-acting 1-micron-thick lecithin light-sensitive elements, the exposed portions had a $R_{dp}$ of (a) 0.26, (b) 0.23, (c) 0.10, (d) 0 and (e) 0 after equal exposures. By suitably increasing the exposure time, the $R_{dp}$ of the non-image areas was reduced to substantially zero with particles (a), (b) and (c).

In somewhat greater detail, the developing powder is applied directly to the light-sensitive layer, while the powder-receptive areas of said layer are in at most only a slightly soft condition and said layer is at a temperature below the melting point of the layer and powder. The powder is distributed over the area to be developed and physically embedded into the stratum at the surface of the light-sensitive layer, preferably mechanically by force having a lateral component, such as to-and-fro and/or circular rubbing or scrubbing action using a soft pad, fine brush or even an inflated balloon. If desired, the powder may be applied separately or contained in the pad or brush. The quantity of powder is not critical provided there is an excess available beyond that required for full development of the area, as the development seems to depend primarily on particle-to-particle interaction rather than brush-to-surface or pad-to-surface forces to embed a layer of powder particles substantially one particle thick (monoparticle layer) into a stratum at the surface of the light-sensitive layer. Only a single stratum of powder particles penetrates into the powder-receptive areas of the light-sensitive layer even if the light-sensitive layer is several times thicker than the developer particle diameter.

The pad or brush used for development is critical only to the extent that it should not be so stiff as to scratch or scar the film surface when used with moderate pressure with the preferred amount of powder to develop the film. Ordinary absorbent cotton loosely compressed into a pad about the size of a baseball and weighing about 3 to 6 grams is especially suitable. The developing motion and force applied to the pad during development is not critical. The speed of the swabbing action is not critical other than that it affects the time required; rapid movement requiring less time than slow. The preferred mechanical action involved is essentially the lateral action applied in ultra-fine finishing of a wood surface by hand sanding or steel wooling.

Hand swabbing is entirely satisfactory, and when performed under the conditions described above, will reproducibly produce the maximum density which the material is capable of achieving. That is, the maximum concentration of particles per unit area will be deposited under the prescribed conditions, dependent upon the physical properties of the material such as softness, resiliency, plasticity, and cohesiveness. Substantially the same results can be achieved using a mechanical device for the powder application. A rotating or rotating and oscillating, cylindrical brush or pad may be used to provide the described brushing action and will produce a substantially similar end result.

After the application of developing powder, excess powder remains on the surface which has not been sufficiently embedded into, or attached to, the layer. This may be removed in any convenient way, as by wiping with a clean pad or brush usually using somewhat more force than employed in mechanical development, by vacuuming, by vibrating, or by air doctoring and recovered. For simplicity and uniformity of results, the excess powder usually is blown off using an air gun having an air-line pressure of about 20 to 40 psi. The gun is preferably held at an angle of about 30° to 60° to the surface at a distance of 1 to 12 inches (3 to 8 preferred). The pressure at which the air impinges on the surface is about 0.1 to 3, and preferably about 0.25 to 2, pounds per square inch. Air cleaning may be applied for several seconds or more until no additional loosely held particles are removed. The remaining powder should be sufficiently ahderent to resist removal by moderately forceful wiping or other reasonably abrasive action.

The principles of deformation imaging, as explained above, can be employed in several ways to form reflective transparent elements suitable for use in this invention. In its simplest form, deformation imaging techniques can be employed to form an array of reflective powder particles in image-wise configuration on a transparent base by exposing a transparent base, bearing a substantially transparent light-sensitive organic layer capable of developing a $R_d$ of 0.2 to 2.2 to actinic radiation to develop a potential $R_d$ of 0.2 to 2.2, embedding a developing powder which is substantially white or composed of reflective metal, and removing powder particles from the non-image areas. In order to produce a reflective transparent photographic element of this type capable of use with a maximum high intensity light source, it is usually desirable that both the base and light-sensitive layer are substantially colorless. However, at a slight sacrifice in heat stability of the reflective photographic element, either the base or light-sensitive layer can contain a substantially transparent colored body. In such case, the light projected through the transparent reflective element may take on the coloration of the transparent colorant and give the appearance of projecting a color on the screen.

As explained above, developing powders suitable for forming an array of reflective powder particles in image-wise configuration, can include various white particles, such as polymeric or resinous materials, metal salts, metal oxides, etc. and reflective metals. When using any fusible white powder, it is essential that the resultant deformation image be employed in the unfused state. If the resinous material is fused to the light-sensitive layer, the polymeric material becomes transparent and the resultant element no longer contains an array of reflective powder particles. While it is desirable to employ white developing powders containing substantially no colorants, lightly tinted developing powders can be used at a slight sacrifice in the heat stability of the reflective photographic element.

Substantially opaque, discontinuous reflective metallic films on a transparent base can be produced by deformation imaging utilizing transparent bases bearing a continuous reflective metallic layer. In this case the transparent base bearing a thin continuous reflective metallic subbing layer and a sensitizer capable of developing a $R_d$ of 0.2 to 2.2, which may be colored or substantially colorless as the case may be, is exposed to actinic radiation to produce a potential $R_d$ of 0.2 to 2.4, and developed with (1) a reactive developing powder capable of decomposing the reflective metal film in the manner described in copending application Ser. No. 74,122, now U.S. Pat. No. 3,677,756 issued July 18, 1972, which is hereby incorporated by reference, and etching the metallic layer, or (2) with a resinous powder, fusing the resinous powder to form a resist to protect the reflective metallic layer in image-wise configuration and subsequently etching the unprotected areas in a suitable etching bath. In either case, the etched transparent element is carefully washed to remove etchant forming a permanent reflective photographic element of archival quality. The residual sensitizer and/or fused developing powder is preferably removed with an appropriate solvent, such as hydrocarbon, halohydrocarbon, alcohol, ketones, etc. of the type used to apply the sensitizer. If residual sensitizer and/or fused developing powder are not going to be removed, the sensitizer and developing powder selected should be substantially transparent in the fused state in order to minimize subsequent infrared heat absorption during projection.

Various other methods of photochemically depositing superficially dry powders in image-wise configuration can be employed to produce transparent photographic elements bearing reflective image areas. However, these techniques have the disadvantage that it is more difficult to control the amount of developing powder deposited per unit area and extremely difficult to produce continuous tone images. Suitable other methods of photochemically depositing superficially dry powders of the type suitable for producing type one reflective elements having an array of white or metallic powder in image-wise configuration on a transparent base include employing a solid, light-sensitive layer of the type described in application Ser. No. 796,847 now U.S. Pat. No. 3,637,385, issued Jan. 25, 1972, and developing under conditions where said standard developer yields an $R_d$ of over 2.2 in which case a multi-layer of powder particles may be deposited. Alternatively, other things being equal, the sensitizers capable of producing images by deformation imaging can be replaced with the light-sensitive compounds of British specification No. 1,152,368, the photoisomerizable light-sensitive compounds of U.S. Pat. No. 3,487,764, the negative-acting photoisomerizable light-sensitive compounds of U.S. Pat. No. 3,450,531, the negative-acting or positive-acting, light-sensitive acetals of U.S. Pat. No. 2,090,450, the positive-acting, photopolymerizable compositions of British specification No. 987,903 and U.S. Pat. No. 3,060,624, etc., the disclosures of which are thereby incorporated for reference. It is, of course, within the scope of this invention to modify any of the aforesaid light-sensitive compositions using the principals of Ser. No. 796,847 now U.S. Pat. No. 3,637,385 issued Jan. 25, 1972, to deposit only a monolayer of white or reflective metallic powder. It is also possible to employ xerographic processes, light-sensitive elements and appropriate white or metallic powders.

In all of these processes for producing a transparent photographic element bearing an array of reflective powders in image-wise configuration, the process comprises the steps of exposing a transparent layer bearing a light-sensitive layer capable of receiving a powder in image-wise configuration to actinic radiation to form a latent powder-receptive image; developing said latent image with substantially white or reflective metallic powder particles to form an array of reflective powder particles in image-wise configuration; removing the powder particles from the non-image areas of said light-sensitive layer to produce a transparent photographic element having an array of reflective powders in image-wise configuration.

Suitable other methods of photochemically producing reflective transparent photographic elements of the second type comprising a substantially transparent base bearing a discontinuous opaque metallic image area, include employing any of the sensitizers described above in connection with the production of a type one reflective image composed of an array of reflective powder particles. In these processes, a transparent layer bearing a reflective opaque metallic layer in turn bearing an appropriate light-sensitive layer capable of receiving a powder in image-wise configuration, is exposed to actinic radiation to form a latent powder-receptive image; said latent image is developed with superficially dry etchant particles to form a layer of etchant particles in image-wise configuration; removing etchant particles from the non-image areas of said light-sensitive layer; and carrying out said etching reaction in a predetermined configuration conforming to the image-wise configuration of the superficially dry etchant particles.

If desired, reflective photographic elements of the second type may also be prepared by forming a conventional resist an a transparent photographic base, metallizing the resist bearing the transparent element and removing the resist to form a suitable reflective photographic element. Any of the aforesaid processes can also be employed to transfer the reflective transparent image areas from the surface of the light-sensitive layer, such as common in xerographic processes or by stratum transfer to a receiving layer of appropriate construction.

While a wide variety of techniques may be employed to produce transparent photographic elements of the above two types, the preferred method, employing deformation imaging has the advantage of providing rapid access to the image, the capability of being used for continuous tone imaging and high resolution, typically 20 to 60 lines per mm. Further, since the sensitizer employed in deformation imaging can be employed in extremely thin layers, residual sensitizer residing on the surface of the imaged photographic element absorbs much less infrared heat than any other sensitizers described herein.

As indicated above, the reflective transparent photographic elements of this invention, which comprise a series of frames or slides wherein substantially all of said frames or slides comprise a transparent base bearing reflective image areas, can be utilized in projectors having a higher energy light source than conventional transparent photographic elements without destruction or deterioration of the transparent photographic element. Accordingly, the reflective transparent photographic elements (films or slides) described herein can be viewed under daylight viewing conditions, without dimming lights, in classrooms thereby enhancing the teaching value of these aids. Likewise, outdoor movie theatres equipped with these transparent photographic elements can commence operation in the late afternoon as opposed to their present practice of starting just as darkness sets in. Further, when the screen is protected from direct sunlight, outdoor advertising signs having approximately 100 to 5,000 square feet of viewing area, may be utilized for advertisements on an all day basis.

The reflective transparent photographic elements of this invention may be used for black and white viewing or for color viewing. In those cases where it is desirable to project color images on the screen, reflective transparent photographic elements simulating each of the primary colors (yellow, blue and red) can be produced by suitable color separation techniques and projected on a screen with projectors equipped with suitable color filters of the appropriate primary color. If desired, each of the separation reflective photographic elements of the same primary color can be placed in a separate roll for movie projection, and projected in synchronization onto a suitable viewing screen reconstructing a multi-color image. Alternatively, each of the separations can be placed in a single roll of film maintaining the same sequence of yellow, blue and red separation reflective images. Movie film of this type can be projected on a projector equipped with a rotating color filter, synchronized with the reflective film to project the appropriate color separation image through the appropriate color filter whereby the eye integrates a full color picture.

If desired, the various color filters can be placed either between the transparent photographic element and the light source or between the transparent photographic element and the screen. In either case, dichroic color filters are preferred to enhance the life of the filter.

Alternatively, so-called "flicker-color" movies or slides of the type described in Subjective (Induced) Color Television, Journal of SMPTE, Vol. 77, October 1968, pages 1025 to 1028 can be employed.

To take maximum advantage of the heat stability of the reflective transparent elements and to minimize infrared absorption by the transparent base, the reflective transparent elements are preferably positioned in the projector with the reflective surface of these elements interposed between the light source and the transparent base. In this way, substantially none of the heat generated by the projection lamp reaches the transparent base in its image areas. On the other hand, if the transparent base is interposed between the reflective image areas and the projector lamp, the energy from the lamp will pass through the transparent base in both the image and non-image areas and be reflected back in the reflective image areas thereby affording the transparent base in the image areas two opportunities to absorb infrared heat generated by the projection lamp. Accordingly, the base in the image areas will tend to absorb about twice as much infrared heat as the base in the non-image areas where the light is not reflected back and the overall infrared heat absorption by the transparent base may be increased substantially.

The following examples are merely illustrative and should not be construed as limiting the scope of this invention.

EXAMPLE I

This example illustrates the preparation of reflective transparent photographic elements suitable for use in projection imaging.

A. The aluminum side of an aluminized Mylar (polyethylene terephthalate) element was flow coated with a solution comprising 0.64 grams Staybelite Ester No. 10 (partially hydrogenated rosin ester of glycerol), 0.16 gram benzil and 0.096 grams 4-methyl-7-dimethylaminocoumarin, dissolved in 100 mls. Chlorothene (1,1,1-trichloroethane), to form a 1 micron light-sensitive layer. The sensitized side of the element was placed in contact with a positive transparency and exposed to actinic radiation in a vacuum frame for about one minute. The unexposed areas were developed with a sodium hydroxide developing powder, prepared by grinding equal parts by weight of sodium hydroxide and micronized Piccolastic D-150 (styrene polymer) with a mortar and pestle. The sodium hydroxide powder was embedded into the unexposed areas of the light-sensitive Staybelite layer by rubbing a wad of cotton over the surface of the element using essentially the same force as employed in the ultrafine finishing of wood. After the non-embedded sodium hydroxide developing powder was removed from the surface of the light-sensitive element, the embedded sodium hydroxide was activated by waving a steam wand across the sodium hydroxide side of the developed image. After a short time, the element was washed with water to remove the sodium hydroxide developing powder and the degraded products from the element. The areas, which had been developed with sodium hydroxide developing powder, were free from any aluminum coating while the areas which had originally been exposed to light and not developed with sodium hydroxide, retained their aluminized coating.

B. Example A was repeated with essentially the same results, except that a developing powder comprising 50 percent by weight ball-milled Piccolastic D-150 and cupric chloride, was employed in place of the sodium hydroxide developing powder.

C. Example A was repeated except that the aluminized Mylar was developed with a Piccolastic D-150 powder containing no etchant, the Piccolastic D-150 was heat fused to form a resin barrier and the aluminum layer was removed in the unprotected areas by immersing the element in a 2.5 percent solution of sodium hydroxide.

D. Reflective transparent photographic elements having an array of white powder particles in image-wise configuration were obtained by applying the sensitizer described in A above to Mylar film and glass plates and developing with Piccolastic D-150 powder forming images capable of resolving 40 line pairs per mm.

E. Example D was repeated except that the Piccolastic D-150 was replaced with aluminum powder to produce reflective images capable of resolving 20 line pairs per mm.

F. Example D was repeated except that the Piccolastic D-150 developing powder was replaced with slightly yellowish Varcum 29–105 phenol-formaldehyde polymer to resolve 60 line pairs per mm. In this case the image was slightly yellow due to the color of the phenol-formaldehyde polymer.

EXAMPLE II

This example illustrates the improved heat resistance of the transparent photographic elements suitable for use in this invention. The heat absorbing filter of a 750-watt Viewlex 35-mm slide projector equipped with an $f/3.5$, 5-inch projection lens, was removed. Conventional silver halide slides prepared on both Mylar and cellulose triacetate were projected. The screen lumens increased about 20 percent by the removal of the heat absorbing filter. However, both the Mylar and cellulose triacetate slides were destroyed in about 10 seconds. Each of the reflective type slides described in Examples A through F in Example I were placed in the projector and showed no deterioration after several minutes of projection. At this point all air cooling was removed from the slide projector and the reflective type slides of Examples A through F were not damaged after 15 minutes' projection.

EXAMPLE III

To obtain greater light output, the projector employed in Example II was modified by replacing the 750-watt lamp with a 300-watt high efficiency metallic alkali-iodine-mercury vapor arc and a cold reflector mirror condensor assembly was substituted for the condensing optics and heat filter in the Viewlex slide projector. It was estimated that the focused light intensity on the slides in the slide projector was approximately 24,000 lumens per square inch and measured screen brightness at 2,500 foot-lamberts was achieved. A conventional silver halide slide was totally destroyed in less than 2 seconds using this apparatus, while the reflective-type transparencies described above in A through F were undamaged after prolonged exposure even with the air cooling removed.

EXAMPLE IV

The Viewlex 35-mm slide projector described in Example II was equipped with a 500-watt mercury short arc, an ellipsoidal, metallic condensing reflector and a double concave lens, to improve the angular acceptance of the projection system. Screen intensities as high as 3,000 foot-lamberts were obtained with this light source. Conventional silver halide slides were permanently damaged in about one second. The slides described in A, B, C and E were placed in the projector without any deterioration of the slides. The polymer-particle particles slides of D and F required a simple air flow in order to prevent gradual decomposition of the polymer particles.

EXAMPLE V

An 1,100-watt carbon-arc projector system was assembled using a 4.5 inch cinemascope projection lens. It was estimated that about 90,000 lumens per square inch was the energy incident on the transparency and the screen had a brightness of 3,000 foot-lamberts. At the best focus, with air jet cooling, the conventional silver halide transparencies were damaged in less than one second, whereas the reflective transparent transparencies described in Examples A through E were projected through long periods without apparent image deterioration.

EXAMPLE VI

Example V was repeated except that four DXC photo lamps were placed at a distance of 18 inches from each of the four corners of the screen in order to simulate the worst possible ambient lighting conditions on a screen (i.e., a vertical surface facing south at noon during the summer solstice) when approximately 2,000 foot-lamberts of light would fall on the screen. The images projected by the carbon arc projector at 3,000 foot-lamberts could be seen easily over this very high surround lighting, indicating that the present system can be used under outdoor lighting conditions.

Since many embodiments of this invention may be made and since many changes may be made in the embodiments described, the foregoing should be interpreted as illustrative only and my invention is defined by the claims appended hereafter.

What is claimed is:

1. Improved heat-resistant transparent photographic elements capable of being projected onto a screen comprising a series of frames or slides, wherein substantially all of said frames or slides comprise a transparent base bearing an array of reflective powder in image-wise configuration.

2. The article of claim 1, wherein said array of reflective powder comprises a monolayer of white powder.

3. The article of claim 1, wherein said reflective powder comprises metallic powder.

4. The article of claim 3, wherein said metallic powder comprises aluminum.

5. The process of projecting an image from a transparent photographic element onto a screen without deterioration or destruction of the photographic element, which comprises projecting a beam of light through the photographic element of claim 1 to subject said photographic element to over 10,000 lumens per square inch.

* * * * *

UNITED STATES PATENT AND TRADEMARK OFFICE
CERTIFICATE OF CORRECTION

PATENT NO. : 3,834,801

DATED : September 10, 1974

INVENTOR(S) : Jay G. Schreckendgust

It is certified that error appears in the above-identified patent and that said Letters Patent are hereby corrected as shown below:

Column 4, line 31, for "02" read ---0.2---
Column 5, line 14, for "powder-free free non-image" read ---powder-free non-image
Column 5, bridging lines 30-31, for "sensitive organic material deposited in a layer is suitable for use" is a repeat of lines 29-30
Column 7, line 9, for "01%" read ---.1%---
Column 7, line 54, for "RCR" read ---PCR---
Column 7, line 54, for "yelloe" read ---yellow---

Column 8, line 6, for "power" read ---powder---
Column 8, line 15, for "plasticzer" read ---plasticizer---
Column 8, line 41, for "ricinoeic" read ---ricinoleic---
Column 9, line 15, for "nylon polystyrene" read ---nylon, polystyrene---
Column 10, bridging lines 30-31, for "in provide to provde" read ---in order to provide---
Column 10, bridging lines 52-53, for "compnds" read ---compounds---
Column 10, line 61, for "deformation transparent" read ---deformation-imaged transparent---
Column 11, line 13, for "oxides silica" read ---oxides (silica---
Column 13, line 43, for "ahderent" read ---adherent---
Column 15, line 11, for "thereby" read ---hereby---
Column 15, line 56, for "an a" read ---on a ---

Signed and Sealed this sixteenth Day of March 1976

[SEAL]

Attest:

RUTH C. MASON
Attesting Officer

C. MARSHALL DANN
Commissioner of Patents and Trademarks